(12) United States Patent
Kallio et al.

(10) Patent No.: US 8,828,901 B2
(45) Date of Patent: Sep. 9, 2014

(54) PREPARATION OF A SOLID CATALYST SYSTEM

(75) Inventors: Kalle Kallio, Porvoo (FI); Marja Mustonen, Koskenkylan Saha (FI); Pertti Elo, Jarvenpaa (FI); John Severn, Helsinki (FI); Peter Denifl, Helsinki (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/696,184

(22) PCT Filed: Apr. 28, 2011

(86) PCT No.: PCT/EP2011/056702
§ 371 (c)(1),
(2), (4) Date: Jun. 3, 2013

(87) PCT Pub. No.: WO2011/138212
PCT Pub. Date: Nov. 10, 2011

(65) Prior Publication Data
US 2013/0245212 A1 Sep. 19, 2013

(30) Foreign Application Priority Data
May 7, 2010 (EP) .................................. 10162239

(51) Int. Cl.
*C08F 4/642* (2006.01)
*C08F 4/6592* (2006.01)

(52) U.S. Cl.
USPC ........... 502/104; 502/103; 502/152; 526/160; 526/165; 526/943

(58) Field of Classification Search
USPC ........... 502/103, 104, 152; 526/160, 165, 943
See application file for complete search history.

(56) References Cited

U.S. PATENT DOCUMENTS 5,922,631 A  7/1999 Sangokoya

FOREIGN PATENT DOCUMENTS

EP     2186832 A1    5/2010
WO  03/082879 A1   10/2003

*Primary Examiner* — Caixia Lu
(74) *Attorney, Agent, or Firm* — Tarolli, Sundheim, Covell & Tummino LLP (57) ABSTRACT

Process for the preparation of a solid catalyst system comprising the steps of generating an emulsion by dispersing a liquid clathrate in a solution wherein (i) the solution constitutes the continuous phase of the emulsion and (ii) the liquid clathrate constitutes in form of droplets the dispersed phase of the emulsion, solidifying said dispersed phase to convert said droplets to solid particles and optionally recovering said particles to obtain said catalyst system, wherein the liquid clathrate comprises a lattice being the reaction product of aluminoxane, an organometallic compound of a transition metal of Group 3 to 10 of the Periodic Table (IUPAC 2007) or of an actinide or lanthanide, and a further compound being effective to form with the aluminoxane and the organometallic compound the lattice, and a guest being an hydrocarbon compound, and the solution comprises a silicon fluid and a hydrocarbon solvent.

11 Claims, 4 Drawing Sheets

Figure 1: Light microscope picture form septa bottle having heptane washed catalyst system. Catalyst system was formed from silicon oil emulsion. (Catlayst of example 4)

Figure 2: SEM picture form catalyst system prepared according to example 4

Figure 3: SEM picture form catalyst system prepared according to example 4

Figure 6: SEM picture from polymer particles of example 14

Figure 7: SEM picture from polymer particles of example 14

Figure 8:	SEM picture from polymer particles of example 14

Figure 9:	SEM picture from polymer particles of example 14

PREPARATION OF A SOLID CATALYST SYSTEM

This application is a National Phase Filing of PCT/EP2011/056702, filed Apr. 28, 2011, which claims priority to European Patent Application No. 10162239.7, filed May 7, 2010, the subject matter of which are incorporated herein by reference in their entirety.

The present invention is directed to a new method for preparing a solid catalyst system enabling the preparation of polymers with high bulk density and catalysts prepared thereof.

In the field of catalysts since many years great efforts are undertaken to further improve the catalyst types tailored for specific purposes. For instance in polymerization processes metallocene catalyst systems are widely used having many advantages.

At the beginning of the development of new metallocene catalyst systems only homogeneous catalyst systems were available. Such homogeneous catalyst systems are solutions of one or more catalyst components, e.g. a transition metal compound and optionally a cocatalyst. Homogeneous systems are used as liquids in the polymerization process. Such systems have in general a satisfactory catalytic activity, but their problem has been that the polymer thus produced has a poor morphology (e.g. the end polymer is in a form of a fluff having a low bulk density). As a consequence, operation of slurry and gas phase reactors using a homogeneous catalyst system causes problems in practice for instance in terms of reactor fouling.

To overcome the problems of the homogeneous catalyst systems supported systems have been developed. These supported systems, known as heterogeneous catalyst systems, comprise carrier materials, such as porous organic and inorganic support materials, like silica, $MgCl_2$ or porous polymeric materials onto which the catalyst is loaded or supported.

However, also supported catalyst systems cause problems. For instance, to mention only one among many, it is difficult to get an even distribution of the catalyst components in the porous carrier material. Further leaching of the catalyst components from the support can occur. Such drawbacks lead to an unsatisfactory polymerization behavior of the catalyst, and as a result the morphology of the polymer product thus obtained is also poor. Further such classic heterogeneous catalyst systems show reduced catalyst activity which is of course detrimental as the catalyst amount must be increased which in turn leads to polymer products contaminated with rather high amounts of catalyst residues including silica residues, which might be very detrimental in some product applications.

For this reason a new metallocene catalyst system has been developed which significantly reduces the drawbacks of the known heterogeneous catalyst systems. Such new catalyst systems are solid catalyst systems, but are not in need of catalytically inert support material, and are further featured by spherical particles with low porosity. Such new metallocene catalyst systems enable to increase the output rate of polymers since the bulk density of the polymerized product can be increased. For the first time such new metallocene catalyst systems have been for instance described in WO 03/051934. These types of catalysts have solved many problems caused by catalysts of earlier prior art.

In addition to the catalyst types described above, there are also catalysts, where catalyst component aluminoxane, like MAO, itself forms support for the catalysts.

Many prior art catalysts have, however, a general drawback relating to their tendency to dissolve in the polymerisation medium, and thus causing undesired fouling in the reactors. Thus, there remains still some work to do to improve the properties of the catalyst especially in the morphology point of view and in a way that the desired morphology would remain and be effectively used, during the polymerization, which would also decrease fouling and sheeting problems.

Moreover nowadays the catalyst shall be not only suitable for specific processes for producing desired polymers but there is a general tendency to find out methods, also in catalyst preparation field, where the starting materials are safer and easier to be used both in environmental as well handling point of view. Thus there is the strong need to develop preparation methods of such catalyst systems based on materials which promote sustainable preparation methods as well as are easily commercially accessible and thus well priced.

Thus the object of the present invention is to find an improved and suitable process for the manufacture of solid catalyst systems without the need of using external support materials, and which render possible to produce polymers in an efficient manner, i.e. using solid catalyst systems which are less soluble in the polymerization media and are obtained by a sustainable preparation process. A further object is that the obtained catalyst system enables to produce high bulk density polymers with narrow particle size distribution in an efficient manner.

The finding of the present invention is that the solid catalyst system must be produced based on emulsion technology in which a liquid clathrate constitutes the dispersed phase of the emulsion and the solvents used in the preparation process are halogen free solvents. It is a particular finding of the present invention that a solution of a halogen free solvent, like silicon fluid and a hydrocarbon solvent as the continuous phase enables to produce solid catalyst systems with a very narrow particle size distribution and very smooth particle surface morphology.

Thus the present invention is directed to a process for the preparation of a solid catalyst system (CS) comprising the steps of (I) generating an emulsion (E) by dispersing a liquid clathrate (LC) in a solution (S) wherein
  (i) the solution (S) constitutes the continuous phase (CP) of the emulsion (E) and (ii) the liquid clathrate (LC) constitutes in form of droplets the dispersed phase (DP) of the emulsion (E), (II) solidifying said dispersed phase (DP) to convert said droplets to solid particles and (III) optionally recovering said particles to obtain said catalyst system (CS), wherein (a) the liquid clathrate (LC) comprises
  (i) a lattice (L) being the reaction product of
    (α) aluminoxane (A),
    (β) an organometallic compound (O) of a transition metal (M) of Group 3 to 10 of the Periodic Table (IUPAC 2007) or of an actinide or lanthanide, and
    (γ) a compound (B) being effective to form with the aluminoxane (A) and the organometallic compound (O) the lattice (L),
  and
  (ii) a guest (G) being an hydrocarbon compound (HC),
and
(b) the solution (S) comprises non-halogenated fluid (NF) and a hydrocarbon solvent (HS).

Surprisingly it has been found out that with the above defined process in an effective manner solid catalyst systems (CS) are producible, which enables a person skilled in the art to produce polymers, in particular polyethylene and polypropylene and their copolymers, with high bulk density and narrow particle size distribution. Further, the process makes it possible to use solvents which are from a environmentally, safety and healthy point of view easy and convenient to be used.

One further remarkably aspect of the solid catalyst system (CS) obtained according to the instant process is that said solid catalyst system (CS) does not comprise any catalytically inert support material. Inert support material according to this invention is any material which is used to decrease solubility of the catalyst systems in media which are generally used in polymerization processes as well in common solvents like pentane, heptane and toluene. Typical inert support materials are organic and inorganic support materials, like silica, $MgCl_2$ or porous polymeric material. These support materials are generally used in amounts of at least 50 wt.-%, more preferably of at least 70 wt.-%. Accordingly in the inventive process no external support material is used and thus the amount of support material within the obtained solid catalyst system (CS) is below 10.0 wt.-%, yet more preferably below 5.0 wt.-%, yet more preferably not detectable. As a consequence that the solid catalyst system (CS) of the invention has a rather low surface area and low porosity.

In the following the essential features of the present invention are described in more detail.

The term "solution" throughout the present application indicates that two or more substances are homogenous mixed.

An "emulsion" according to this invention is a mixture of at least two liquid substances forming separate phases, i.e. an at least liquid/liquid two phase system. Preferably two liquid phases are present in the emulsions of the present invention. One substance (the dispersed phase) is dispersed in the other (the continuous phase) as droplets. In the present application the continuous phase is the solution (S) and the dispersed phase (in the form of droplets) is the liquid clathrate (LC).

The term "solidifying" or "solidification" shall indicate in the present application, in contrast to precipitation techniques, that the catalyst is solidified in a controlled manner, namely that the solidification of the catalyst system occurs in the droplets of the dispersed phase, and no chemical reaction occurs between the active catalyst components and any possible additional agent. Precipitation, instead, is caused by a chemical reaction between the catalyst components and the precipitating agent. Due to the solidification method used in the present invention the spherical shape of the droplets remain intact in the solid state. Accordingly the solid catalyst system particles produced by emulsion technology are much uniform and have the active sites evenly distributed thorough the catalyst particles and have pronounced spherical shape compared to particles produced by known precipitation methods.

The term "liquid" according to this invention indicates that a compound (including a liquid) is liquid by normal pressure (1 atm) at ambient temperature (room temperature. i.e. at 20 to 25° C.).

A "liquid clathrate" is according to this invention a liquid which comprises, preferably consists of, a lattice (L), i.e. the reaction product of aluminoxane (A), the organometallic compound (O), and the compound (B), and a guest (G) enclosed therein. Liquid clathrates are well known and for instance described by Atwood, Jerry L. Dep. Chem., Univ. Alabama, Tuscaloosa, Ala., USA. Editor(s): Robinson, Gregory Heagward; Coord. Chem. Alum. (1993), p. 197-32. Publisher: VCH, New York, N.Y. CODEN: 59ECAI Conference; General Review written in English. CAN 119:117290; John D. Holbrey, "Liquid clathrate formation in ionic liquid-aromatic mixtures", Chem. Commun., 2003, pages 476 to 477, and Scott K. Spear, Encyclopedia of Supramolecular Chemistry, 2001, pages 804 to 807. Accordingly the "liquid clathrate (LC)" is preferably a liquid in which the lattice (L) constitutes the superstructure wherein the guest (G) is embedded. Preferably the guest (G) stabilizes said superstructure.

"Surfactants" according to this invention are agents that lower the surface tension of a liquid and lower the interfacial tension between two phases, here the solution (S) and the liquid clathrate (LC), and thus enable or facilitate the formation of emulsions as well act as stabilizer in the emulsion. Preferably surfactants are not needed in the process of the invention.

"Non-halogenated fluids" (NF) are selected from the group consisting of mineral oils, silicon fluids and liquid polymers. Silicon fluids (SF) are easily available and have turned out to work well in the process of the invention, being thus preferred fluids.

An additional benefit of the clathrated catalysts of the present invention over the standard metallocene/MAO based catalysts is the low solubility into solvents including solvents used in polymerization, being maybe the biggest additional advantage of clathrated catalyst. One finding of the present invention is that the liquid clathrate (LC) is more stable as traditional catalyst/co-catalyst structures and thus is less soluble in preferred media for solidification. This improved stability opens new ways for converting of liquid catalyst systems based on organometallic compounds (O) into solid catalyst systems.

Thus one essential aspect of the invention is that the solid catalyst is obtained by the use of a specific liquid clathrate (LC). Accordingly the liquid clathrate (LC) of the present invention comprises (a) a lattice (L) being the reaction product of
  (i) aluminoxane (A),
  (ii) an organometallic compound (O) of a transition metal (M) of Group 3 to 10 of the Periodic Table (IUPAC 2007) or of an actinide or lanthanide, and
  (iii) a compound (B) being effective to form with the aluminoxane (A) and the organometallic compound (O) the lattice (L),
and
(ii) a guest (G) being an hydrocarbon compound (HC).

Preferably the lattice (L) is formed by reacting the compound (B) with the aluminoxane (A) and/or the organometallic compound (O) in a hydrocarbon compound (HC). Thus in the following the individual reactants are defined in more detail.

As stated above for the formation of the lattice (L) of the liquid clathrate (LC) a compound (B) is necessary which reacts with the aluminoxane (A) and/or the organometallic compound (O). Preferably the compound (B) is an M-X compound or an organo-silicon compound (OS) being different to the non halogenated fluid (NF), i.e. different to the silicon fluid (SF).

M-X compounds which are effecting the formation of a lattice (L) with the aluminoxane (A) and/or the organometallic compound (O) are organic, inorganic or organometallic compounds which can potentially dissociate or partially dissociate into cationic ($M^+$) and anionic components (X). Such compounds are for instance disclosed for example in WO 97/14700.

"M" can be an alkali or alkaline earth metal, like Na, K, Li, Mg or Ca, and

"X" can be a halide, like F, Cl or Br, a pseudohalide or an anionic group, like an allylic or a benzylic hydrocarbon group.

The term "pseudohalide" refers to moieties which are not halides but are generally considered to be a good leaving group in substitution reaction. Pseudohalides can include, for example, azides, cyanide, cyanate, thiocyanate, isocyanate, isothiocyanate, silicon groups, sulfur groups, nitrogen groups, oxygen groups, boron groups and phosphorous groups.

Preferred examples for M-X compounds are alkali and alkaline earth halides or pseudohalides such as KCl, KF, LiCl, $CaCl_2$, $MgCl_2$, $MgF_2$, NaF, $NaBO_4$, $KOSiR_3$, wherein R being a $C_1$ to $C_6$-alkyl residue, or KR', wherein R' is an allylic hydrocarbon group or a benzylic hydrocarbon group.

The reaction of such M-X compounds with the aluminoxane (A) and/or the organometallic compound (O), preferably in an liquid hydrocarbon compound (HC) as defined in detail below, leads to the formation of the lattice (L) of the liquid clathrate (LC).

Other examples of M-X compounds include metal hydrides such as KH, LiH and alkyl, aryl and alkyl-aryl ammonium, phosphonium, sulfonium and other organometallic salts of halides and pseudo halides such as $R_4NCl$, $MePh_3PBr$, $NaBPh_4$, $KB(C_6F_5)_4$, $LiR_4Al$, R being a $C_1$ to $C_8$-alkyl residue.

Also allylic and benzylic organolithium, organopotassium and organocesium compounds are suitable as M-X compounds. Reference is made to Organometallics in Synthesis—A Manual, $2^{nd}$ Edition, Ed. Manfred Schlosser; Wiley, (2002) p. 161 to 162, ISBM 0-471-98416-7, which is incorporated here by reference.

Preferably used M-X compounds are KCl, KF, NaF, LiCl, $CaCl_2$, $MgCl_2$, $MgF_2$, KH, LiH, $KOSiR_3$, $NaBPh_4$, $Me_4NCl$, $(Octyl)_3NClMe$, $MePh_3PBr$, $KB(C_6F_5)_4$ and $KCH_2$—$C_6H_5$ More preferably used M-X compounds are KCl, KF, NaF, $Me_4NCl$, $(Octyl)_3NClMe$, KH, $MePh_3PBr$, $NaBPh_4$, $KOSiMe_3$, and $KCH_2$—$C_6H_5$ The molar ratio of aluminum, provided by the aluminoxane (A), and M (cationic moiety), provided by the M-X compound is in the range of 1:1 to 50:1, preferably from 5:1 to 30:1 and more preferably from 8:1 to 25:1.

The organo-silicon compound (OS) which is effective to form the lattice (L) with the aluminoxane (A) and/or the organometallic compound (O) can be selected from the group of hydrocarbyloxysilanes of the formula $R_3Si$—O[—$SiR_2$—O]$_n$—$SiR_3$ or Si—[O—R]$_4$ wherein R is, independently, a hydrocarbyl group having up to about 18 carbon atoms (e.g. linear or branched alkyl, cycloalkyl, aryl, aralkyl) and n is 0 to 3; and hydrocarbylpolysiloxanes having from 2 to 6 silicon atoms in the molecule and which are separated from each other by an oxygen atom such that there is a linear, branched or cyclic backbone of alternating Si and oxygen atoms, with the remainder of the four valence bonds of each of the silicon atoms individually satisfied by an univalent hydrocarbyl group, R, as just defined. Preferred hydrocarbyl groups, R, are methyl, ethyl and phenyl. Examples of such organo-silicon compounds (OS) include tetra-methoxysilane, tetra-ethoxysilane, tetralphenoxysilane, methoxytrimethylsilane, ethoxytrimethylsilane, hexamethyldisiloxane, hexaethyldisiloxane, hexaphenyldisiloxane, tetramethyldiphenyldisiloxane, dimethyltetraphenyldisiloxane, hexamethylcyclotrisiloxane, octamethylcyclotetrasiloxane, octaphenylcyclotetrasiloxane, octamethyltrisiloxane, decamethyltetrasiloxane, dodecamethylpentasiloxane and tetradecamethylhexasiloxane.

Preferred organo-silicon compounds (OS) are octamethyltrisiloxane, decamethyltetrasiloxane, octamethylcyclotetrasiloxane, methoxytrimethylsilane and tetraethoxysilane.

The molar ratio of aluminum, provided by the aluminoxane (A), and the organo-silicon compound (OS) is in the range of 1:1 to 200:1, preferably from 100:1 to 5:1 and more preferably from 50:1 to 10:1.

Preferably used as compound (B) are the above described organo-silicon compounds (OS).

The aluminoxane (A) can be any conventional aluminoxane as is known in the art.

Aluminoxanes are commercially available or can be prepared according to prior art literature for example by the hydrolysis of aluminium alkyls either by direct water addition or by treatment with salt hydrates. There are a variety of methods for preparing aluminoxane and modified aluminoxanes, non-limiting examples of which are described in U.S. Pat. No. 4,665,208, U.S. Pat. No. 4,952,540, U.S. Pat. No. 5,091,352, U.S. Pat. No. 5,206,199, U.S. Pat. No. 5,204,419, U.S. Pat. No. 4,874,734, U.S. Pat. No. 4,924,018, U.S. Pat. No. 4,908,463, U.S. Pat. No. 4,968,827, U.S. Pat. No. 5,308,815, U.S. Pat. No. 5,329,032, U.S. Pat. No. 5,248,801, U.S. Pat. No. 5,235,081, U.S. Pat. No. 5,157,137, U.S. Pat. No. 5,103,031, U.S. Pat. No. 5,391,793, U.S. Pat. No. 5,391,529, U.S. Pat. No. 5,693,838, U.S. Pat. No. 5,731,253, U.S. Pat. No. 5,731,451 U.S. Pat. No. 5,744,656, EP-A-0 561 476, EP-B1-0 279 586, EP-A-0 594-218, and WO 94/10180, all of which are herein fully incorporated by reference.

Aluminoxanes are also called alumoxanes.

Preferably, $C_1$ to $C_{10}$-alkylalumoxanes, particularly methylalumoxane or modified methylalumoxane, isobutylalumoxane, e.g. TIBAO (tetraisobutylalumoxane) or HIBAO (hexaisobutylalumoxane) are used. More preferably the aluminoxane (A) is methylalumoxane (MAO).

Most preferably the aluminoxane (A) is MAO commercially available as 5 to 30 wt % solution in toluene.

The third compound used for the formation of the lattice (L) is an organometallic compound (O) of a transition metal (M) of Group 3 to 10 of the Periodic Table (IUPAC 2007) or of an actinide or lanthanide.

The term "an organometallic compound (O) of a transition metal (M)" in accordance with the present invention includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well as lanthanides or actinides.

Accordingly, said organometallic compound (O) of a transition metal (M) may have the following formula (I):

$$(L)_m R_n MX_q \qquad (I)$$

wherein

"M" is a transition metal as defined above, preferably Zr, Ti, or Hf, each "X" is independently a monovalent anionic ligand, such as a σ-ligand, each "L" is independently an organic ligand which coordinates to the transition metal "M", "R" is a bridging group linking two ligands "L", "m" is 1, 2 or 3, "n" is 0, 1 or 2, preferably 0 or 1, "q" is 1, 2 or 3, and m+q is equal to the valency of the metal.

In a more preferred definition, each organic ligand "L" is independently (a) a substituted or unsubstituted cyclopentadienyl or a mono-, bi- or multifused derivative of a cyclopentadienyl which optionally bear further substituents and/or one or more hetero ring atoms from a Group 13 to 16 of the Periodic Table (IUPAC); or (b) an acyclic η¹- to η⁴- or η⁶-ligand composed of atoms from Groups 13 to 16 of the Periodic Table, and in which the open chain ligand may be fused with one or two, preferably two, aromatic or non-aromatic rings and/or bear further substituents; or (c) a cyclic sigma-, η¹- to η⁴- or η⁶-, mono-, bi- or multidentate ligand composed of unsubstituted or substituted mono-, bi- or multicyclic ring systems selected from aromatic or non-aromatic or partially saturated ring systems, and containing carbon ring atoms and optionally one or more heteroatoms selected from Groups 15 and 16 of the Periodic Table.

More preferably at least one of the organic ligands "L", preferably both organic ligands "L", is (are) selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl.

Further in case the organic ligands "L" are substituted it is preferred that at least one organic ligand "L", preferably both organic ligands "L", comprise(s)

(a) one or more residues independently selected from the group consisting of halogen, $C_1$ to $C_{10}$ alkyl, $C_2$ to $C_{20}$ alkenyl, $C_2$ to $C_{20}$ alkinyl, $C_3$ to $C_{12}$ cycloalkyl, $C_6$ to $C_{20}$ aryl, $C_7$ to $C_{20}$-arylalkyl, $C_3$ to $C_{12}$ cycloalkyl which contains 1, 2, 3 or 4 heteroatom(s) in the ring moiety, $C_6$ to $C_{20}$ heteroaryl and $C_1$ to $C_{20}$ haloalkyl, or more preferably (b) one or more residues independently selected from the group consisting of halogen, $C_1$ to $C_{10}$ alkyl, $C_3$ to $C_{12}$ cycloalkyl, $C_6$ to $C_{20}$ aryl, $C_7$ to $C_{20}$-arylalkyl, $C_3$ to $C_{12}$ cycloalkyl which contains 1, 2, 3 or 4 heteroatom(s) in the ring moiety, $C_6$ to $C_{20}$ heteroaryl and $C_1$ to $C_{20}$ haloalkyl.

By "σ-ligand" is meant throughout the invention a group bonded to the transition metal (M) at one or more places via a sigma bond.

Further the ligands "X" are preferably independently selected from the group consisting of hydrogen, halogen, $C_1$ to $C_{20}$ alkyl, $C_1$ to $C_{20}$ alkoxy, $C_2$ to $C_{20}$ alkenyl, $C_2$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl.

Additionally the bridging group "R" may a bridge of 1 to 7 atoms length, preferably with at least one heteroatom. Accordingly the bridging group "R" is a bridge of 1 to 7 C-atoms, e.g. a bridge of 1 to 4 C-atoms and 0 to 4 heteroatoms, wherein the heteroatom(s) can be e.g. Si, Ge and/or O atom(s), whereby each of the bridge atoms may bear independently substituents, such as $C_1$ to $C_{20}$-alkyl, tri($C_1$ to $C_{20}$-alkyl)silyl, tri($C_1$ to $C_{20}$-alkyl)siloxy or $C_6$ to $C_{20}$-aryl substituents); or a bridge of 1 to 3, e.g. one or two, hetero atoms, such as Si, Ge and/or O atom(s), e.g. —SiR¹$_2$, wherein each R¹ is independently $C_1$ to $C_{20}$-alkyl, $C_6$ to $C_{20}$-aryl or tri($C_1$ to $C_{20}$-alkyl)silyl-residue, such as a trimethylsilyl-residue. It is in particular appreciated that the bridging group(s) (R) has (have) the formula (II)

$$—Y(R')(R")— \qquad (II)$$

wherein

Y is carbon (C), silicon (Si) or germanium (Ge), and

R', R" are independently selected from the group consisting of is $C_1$ to $C_{20}$ alkyl, $C_4$ to $C_{10}$ cycloalkyl, $C_6$ to $C_{12}$ aryl, $C_7$ to $C_{12}$ arylalkyl, or trimethylsilyl.

According to a preferred embodiment said organometallic compound (O) of formula (I) is a group of compounds known as metallocenes. Said metallocenes bear at least one organic ligand, generally 1, 2 or 3, e.g. 1 or 2, which is η-bonded to the metal, e.g. a η²- to η⁶-ligand, such as a η⁵-ligand.

Preferably, a metallocene according to this invention is a transition metal (M) of anyone of the groups 4 to 6 of the periodic table (IUPAC), suitably titanocene, zirconocene or hafnocene, which contains at least one η⁵-ligand, which is an optionally substituted cyclopentadienyl, an optionally substituted indenyl, an optionally substituted tetrahydroindenyl or an optionally substituted fluorenyl. Thus the transition metal compound has preferably the formula (III)

$$(Cp)_2 R_n MX_2 \qquad (III)$$

wherein

"M" is zirconium (Zr), hafnium (Hf), or titanium (Ti), preferably zirconium (Zr) or hafnium (Hf), each "X" is independently a monovalent anionic α-ligand, preferably selected from the group consisting of hydrogen, halogen, $C_1$ to $C_{20}$ alkyl, $C_1$ to $C_{20}$ alkoxy, $C_2$ to $C_{20}$ alkenyl, $C_1$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl, more preferably each "X" is Cl, each "Cp" is independently an unsaturated organic cyclic ligand which coordinates to the transition metal (M), "R" is a bridging group linking two organic ligands (L), preferably the bridging group (R) has the formula (II)

"n" is 0 or 1, preferably 1, and at least one "Cp"-ligand, preferably both "Cp"-ligands, is (are) selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, preferably substituted indenyl.

The substituted Cp-ligand(s) may have one or more substituent(s) being selected form the group consisting of halogen, hydrocarbyl (e.g. linear $C_1$ to $C_{20}$ alkyl, branched $C_3$ to $C_{20}$ alkyl, linear $C_1$ to $C_{20}$ alkenyl, branched $C_4$ to $C_{20}$ alkenyl, $C_2$ to $C_{20}$ alkinyl, $C_3$ to $C_{12}$ cycloalkyl, $C_1$ to $C_{20}$ alkyl substituted $C_5$ to $C_{20}$ cycloakyl, $C_5$ to $C_{20}$ cycloakyl substituted $C_1$ to $C_{20}$ alkyl wherein the cycloakyl residue is substituted by $C_1$ to $C_{20}$ alkyl, $C_6$ to $C_{20}$ aryl, $C_7$ to $C_{20}$ arylalkyl, $C_3$ to $C_{12}$-cycloalkyl which contains 1, 2, 3 or 4 heteroatom(s) in the ring moiety, $C_6$ to $C_{20}$-heteroaryl, $C_1$ to $C_{20}$-haloalkyl, —SiR''$_3$, —SR'', —PR''$_2$ or —NR''$_2$, each R'' is independently a hydrogen or hydrocarbyl (e.g. $C_1$ to $C_{20}$ alkyl, $C_1$ to $C_{20}$ alkenyl, $C_2$ to $C_{20}$ alkinyl, $C_3$ to $C_{12}$ cycloalkyl, or $C_6$ to $C_{20}$ aryl) or e.g. in case of —NR''$_3$, the two substituents R'' can form a ring, e.g. five- or six-membered ring, together with the nitrogen atom wherein they are attached to.

In a suitable subgroup of the compounds of formula (III) each "Cp"-ligand independently bears one or more, like two, substituents selected from $C_1$ to $C_{20}$-alkyl, $C_5$ to $C_{20}$ cycloakyl substituted $C_1$ to $C_{20}$ alkyl wherein the cycloakyl residue is substituted by $C_1$ to $C_{20}$ alkyl, $C_6$ to $C_{20}$-aryl, $C_7$ to $C_{20}$-arylalkyl (wherein the aryl ring alone or as a part of a further moiety may further be substituted as indicated above), wherein R'' is as indicated above, preferably $C_1$ to $C_{20}$-alkyl, the ligand "X" is hydrogen (H), halogen, $C_1$ to $C_{20}$-alkyl, $C_1$ to $C_{20}$-alkoxy, $C_6$ to $C_{20}$-aryl, $C_7$ to $C_{20}$-arylalkenyl or —NR''$_2$ as defined above, e.g. —N($C_1$ to $C_{20}$-alkyl)$_2$, and the bridging group "R" is a methylene, ethylene or a silyl bridge, whereby the silyl can be substituted as defined above, e.g. a dimethylsilyl=, methylphenylsilyl=, methylcylohexylsilyl=, or trimethylsilylmethylsilyl=-bridge.

Examples of compounds wherein the metal atom bears a-NR''$_2$ ligand are disclosed i.e. in WO 98/56831 and WO 00/34341. The contents of the documents are incorporated herein by reference. Further metallocenes are described e.g. in EP 260 130. As further examples of usable metallocenes may also be found e.g. from WO 97/28170, WO 98/46616, WO 98/49208, WO 99/12981, WO 99/19335, WO 98/56831, WO 00/34341, EP 423 101 and EP 537 130 as well as V. C. Gibson et al., in *Angew. Chem. Int. Ed., engl.*, vol 38, 1999, pp 428-447, the disclosures of which are incorporated herein by reference.

In an specific embodiment the organometallic compound (O) of a transition metal (M) is a compound of formula (IV)

(Cp)$_2$RMX$_2$ (IV)

wherein
"M" is zirconium (Zr) or hafnium (Hf),
each "X" is independently a σ-ligand,
each "Cp" is independently an indenyl ligand which coordinates to the transition metal (M),
said indenyl ligand is at least substituted at the five membered ring (substituent (S5)) and the six membered ring (substituent (S6)) of the indenyl ligand,
"R" is a bridging group linking said organic ligands (L).

More preferably the ligands "X" of formula (IV) can independently be selected from the group consisting of hydrogen, halogen, $C_1$ to $C_{20}$ alkyl, $C_1$ to $C_{20}$ alkoxy, $C_2$ to $C_{20}$ alkenyl, $C_2$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR'', —PR''$_3$, —SiR''$_3$, —OSiR''$_3$ and —NR''$_2$,
wherein each R'' is independently hydrogen, $C_1$ to $C_{20}$ alkyl $C_2$ to $C_{20}$ alkenyl, $C_2$ to $C_{20}$ alkinyl, $C_3$ to $C_{12}$ cycloalkyl or $C_6$ to $C_{20}$ aryl. In a preferred embodiments the ligands "X" are identical and either halogen, like Cl, or benzyl.

A preferred monovalent anionic ligand of formula (IV) is halogen, in particular chlorine (Cl).

The substituents (S6) at the six membered ring as well as the substituents (S5) at the five membered ring are preferably on both indenyl residues the same.

Preferably the substituents (S6) are selected from the group consisting of linear $C_1$ to $C_{20}$ alkyl, branched $C_3$ to $C_{20}$ alkyl, $C_1$ to $C_{20}$ alkyl substituted $C_5$ to $C_{20}$ cycloalkyl, $C_5$ to $C_{20}$ cycloalkyl substituted $C_1$ to $C_{20}$ alkyl wherein the cycloalkyl residue is substituted by $C_1$ to $C_{20}$ alkyl, arly, like phenyl, and substituted aryl, like substituted phenyl. More preferably the substituents (S6) are selected from the group consisting of methyl, ethyl, n-propyl, iso-propyl, n-butyl, tert-butyl, cyclohexyl, methyl-(methyl-cyclohexyl), methylphenyl, ethylphenyl, n-propylphenyl, iso-propylphenyl, n-butylphenyl, tert-butylphenyl, cyclohexylphenyl, methyl-(metal-cyclohexyl)-phenyl.

Preferably the substituents (S5) are selected from the group consisting of linear $C_1$ to $C_{20}$ alkyl, branched $C_3$ to $C_{20}$ alkyl, $C_4$ to $C_{12}$ cycloalkyl, $C_1$ to $C_{20}$ alkyl substituted $C_5$ to $C_{20}$ cycloalkyl, and $C_6$ to $C_{20}$ aryl. More preferably the substituents (S5) are selected from the group consisting of methyl, ethyl, n-propyl, iso-propyl, n-butyl, tert-butyl, cyclohexyl, and phenyl. Especially preferred substituents (S5) are linear $C_1$ to $C_{20}$ alkyl or branched $C_3$ to $C_{20}$ alkyl, like —C(CH$_3$)$_3$.

The bridging group of formula (III) or (IV) is preferably the bridging group "—Y(R')(R'')—" of formula (II) as defined above, more preferably
Y is Si and
R' and R'' are independently from each other selected from the group consisting of $C_1$ to $C_{10}$ alkyl, $C_4$ to $C_{10}$ cycloalkyl, and $C_6$-$C_{12}$ aryl.

Said transition metal compounds of formula (I), (III) and (IV) being of metallocene type and their preparation are well known in the art. Metallocenes as defined in the instant invention are particularly preferred.

Alternatively, in a further subgroup of the metallocene compounds, the transition metal (M) bears a "Cp"-ligand as defined above for formula (I), (III) or (IV) and additionally a η$^1$- or η$^2$-ligand, wherein said ligands may or may not be bridged to each other. This subgroup includes so called "scorpionate compounds" (with constrained geometry) in which the transition metal (M) is complexed by a η$^5$-ligand bridged to a η$^1$- or η$^2$-ligand, preferably η$^1$- (for example σ-bonded) ligand, e.g. a metal complex of a "Cp"-ligand as defined above, e.g. a cyclopentadienyl group, which bears, via a bridge member, an acyclic or cyclic group containing at least one heteroatom, e.g. —NR''$_2$ as defined above. Such compounds are described e.g. in WO 96/13529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl.

Another subgroup of the transition metal compounds of formula (I) usable in the present invention is known as non-metallocenes wherein the transition metal (M) (preferably a Group 4 to 6 transition metal, suitably Ti, Zr or Hf) has a coordination ligand other than cyclopentadienyl ligand.

The term "non-metallocene" used herein means compounds, which bear no cyclopentadienyl ligands or fused derivatives thereof, but one or more non-cyclopentadienyl η-, or σ-, mono-, bi- or multidentate ligand. Such ligands can be chosen e.g. from
(a) acyclic, η$^1$- to η$^4$- or η$^6$-ligands composed of atoms from Groups 13 to 16 of the periodic table (IUPAC), e.g. an acyclic pentadienyl ligand wherein the chain consists of carbon atoms and optionally one or more heteroatoms from groups 13 to 16 (IUPAC), and in which the open chain ligand may be fused with one or two, preferably two, aromatic or non-aromatic rings and/or bear further substituents (see e.g. WO 01/70395, WO 97/10248 and WO 99/41290), or (b) cyclic σ-, $\eta^1$- to $\eta^4$- or $\eta^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from groups 15 and 16 of the periodic table (IUPAC) (see e.g. WO 99/10353).

Bi- or multidentate ring systems include also bridged ring systems wherein each ring is linked via a bridging group, e.g. via an atom from groups 15 or 16 of the periodic table (IUPAC), e.g. N, O or S, to the transition metal (M) (see e.g. WO 02/060963). As examples of such compounds, i. a. transition metal complexes with nitrogen-based, cyclic or acyclic aliphatic or aromatic ligands, e.g. such as those described in WO 99/10353 or in the Review of V. C. Gibson at al. "Advances in Non-Metallocene Olefin Polymerization Catalysis" Chem. Rev. 2003, 103, 283315, or with oxygen-based ligands, such as group 4 metal complexes bearing bidentate cyclic or acyclic aliphatic or aromatic alkoxide ligands, e.g. optionally substituted, bridged bisphenolic ligands (see i.a. the above review of Gibson et al). Further specific examples of non-$\eta^5$-ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference.

The preparation of metallocenes and non-metallocenes, and the organic ligands thereof, usable in the invention is well documented in the prior art, and reference is made e.g. to the above cited documents. Some of said compounds are also commercially available. Thus, said transition metal compounds can be prepared according to or analogously to the methods described in the literature, e.g. by first preparing the organic ligand moiety and then metallating said organic ligand (η-ligand) with a transition metal. Alternatively, a metal ion of an existing metallocene can be exchanged for another metal ion through transmetallation.

The molar ratio of aluminium, provided by the aluminoxane (A), and the transition metal (M) is in the range of 1:1 to 10 000:1, preferably from 5:1 to 8 000:1, more preferably from 10:1 to 7 000:1, e.g. 100:1 to 4 000:1.

Typically in case of solid (heterogeneous) catalysts the ratio is from 10:1 to 1000:1, such as 100:1 to 500:1.

The quantity of aluminoxane (A) to be employed in the catalyst of the invention is thus variable and depends on the conditions and the particular transition metal compound chosen in a manner well known to a person skilled in the art.

The hydrocarbon compound (HC) is preferably liquid. Accordingly it is appreciated that the hydrocarbon compound (HC) is an aromatic hydrocarbon solvent, such as for example toluene, benzene, xylenes, ethylbenzene, cumene, mesitylene or cumene. More preferably the hydrocarbon compound (HC) is toluene.

In one embodiment (variant A) the liquid clathrate (LC) is obtainable by, preferably obtained by,
(i) preparing a solution (SO1) of the (liquid) hydrocarbon compound (HC), the aluminoxane (A) and the organometallic compound (O),
(ii) adding to said solution (SO1) the compound (B),
(iii) obtaining a two phase system (TPS1), the upper phase being a (liquid) hydrocarbon compound (HC) rich phase and the lower phase being the liquid clathrate (LC) phase, and
(iv) separating the lower phase being the liquid clathrate (LC) phase from upper phase being the (liquid) hydrocarbon compound (HC) rich phase.

In another embodiment (variant B) the liquid clathrate (LC) is obtainable by, preferably obtained by,
(i) preparing a mixture (M2) of the (liquid) hydrocarbon compound (HC), the aluminoxane (A) and the compound (B),
(ii) adding to said mixture (M2) the organometallic compound (O),
(iii) obtaining a two phase system (TPS2), the upper phase being a (liquid) hydrocarbon compound (HC) rich phase and the lower phase being the liquid clathrate (LC) phase, and
(iv) separating the lower phase being the liquid clathrate (LC) phase from upper phase being a (liquid) hydrocarbon compound (HC) rich phase.

According to variant A the aluminoxane (A) is first reacted with the organometallic compound (O) in the (liquid) hydrocarbon compound (HC), as disclosed above, leading to the solution (SO1). The formed solution (SO1) is further reacted with the compound (B) leading to the formation of a two phase system (TPS1) comprising two stable immiscible organic layers, which remain intact such that the upper layer (being the hydrocarbon compound (HC) rich layer) can be separated from the lower liquid clathrate (LC) layer, i.e. the liquid clathrate (LC).

The reaction is performed preferably under stirring and under inert atmosphere of for example $N_2$ or Argon at temperatures between 10 and 40° C., preferably between 15 and 35° C. and more preferably between 20 and 30° C., for example at room temperature. The upper phase is discarded and the lower liquid clathrate (LC) phase, i.e. the liquid clathrate (LC), is optionally washed before further use. Preferably the liquid clathrate (LC) phase, i.e. the liquid clathrate (LC), is washed once or up to 5 times, preferably once to three times, with the (liquid) hydrocarbon compound (HC), like toluene, used for its preparation.

According to variant B (applies also for variant A) the starting concentration of aluminoxane (A) in the hydrocarbon compound (HC), like toluene, is not particularly critical and usually ranges from 5 to 30 wt.-% solution. For instance methylaluminoxane (MAO) is commercially available as a solution of MAO in toluene. OK To this solution the compound (B) is added obtaining the mixture (M2).

Although the use of ambient temperatures is most convenient, i.e. from 0 to 30° C., some compounds require elevated temperatures up to 80° C. or higher. A person skilled in the art can easily determine experimentally a suitable temperature for any of the compounds (B) as defined in detail below.

The mixture (M2) is then reacted, preferably under stirring, with the organometallic compound (O), as described above, under inert atmosphere of for example $N_2$ or Argon at temperatures between 10 and 40° C., preferably between 15 and 35° C. and more preferably between 20 and 30° C., for example at room temperature.

Phase separation into the two phase system (TPS2) may occur immediately, i.e. by mixing the compound (B) with the aluminoxane (A) in the hydrocarbon compound (HC), like toluene, or may commence after a couple of days, i.e. after two or three days. Separation can be improved if the mixture (M2) with the organometallic compound (O) is cooled down to −20° C.

Accordingly the reaction is characterized by the formation of a two phase system (TPS2) comprising two stable immiscible organic layers, which remain intact such that the upper layer (being the hydrocarbon compound (HC) rich layer) can be separated from the lower liquid clathrate (LC) layer, i.e. the liquid clathrate (LC).

Advantageously the aluminoxane (A), like MAO, exclusively resides in the lower phase, i.e. the liquid clathrate (LC), and alkylaluminium, like trimethylaluminium (unreacted starting material from the preparation of aluminoxane (A), like MAO) is extracted into the hydrocarbon compound (HC) rich upper phase, so that the liquid clathrate phase (LC), i.e. the liquid clathrate (LC), like in variant A, contains decreased amount of unreacted trimethylaluminium. The amount of alkylaluminium will depend on clathrate used, its content in synthesis and the reaction temperature used. A person skilled in art can optimize the synthesis conditions to achieve an optimized removal of unreacted trimethylaluminium.

For further processing the liquid clathrate (LC) phase, i.e. the liquid clathrate (LC), is separated from the upper solvent layer by conventional separation techniques, for example by decantation or draining.

Optionally the separated liquid clathrate (LC) phase can be washed before further use. Preferably the liquid clathrate phase (LC) is washed once or up to 5 times, preferably once to three times, with the hydrocarbon compound (HC) used for its preparation.

A further finding of the present invention is that solid catalyst particles are obtainable. This catalyst can be used as such directly in polymerization process without any solubility and polymerization reactor fouling problems. Another benefit of the present invention is that the solvents used are easily commercially available with reasonable costs and are in healthy, safety and environmental point of view preferred to those commonly used. They are in particular not volatile under the process conditions, which facilitates the handling and use of them during the inventive process. Accordingly a solution (S) comprising a non-halogenated fluid (NF), preferably a silicon fluid (SF), and a hydrocarbon solvent (HS) is very beneficial in the process of the invention, where liquid clathrates (LC) are formed. Additionally the combination of the use of a liquid clathrate (LC) and the specific solution (S) enables to produce solid catalyst systems with a very low surface area and a very narrow particle size distribution that are also requirements for high quality catalyst properties.

Accordingly a further important aspect of the present invention is the specific selected solution (S) which forms with the liquid clathrate (LC) the emulsion (E). The solution (S) must assure that on the one hand no immediate solidification of the catalyst system compounds occur and on the other hand the liquid clathrate (LC) remains as droplets in the emulsion (E) intact.

Accordingly the liquid clathrate (LC) must be immiscible or only partly miscible (not more than 20 wt.-%, preferably not more than 10 wt.-%, like not more than 5 wt.-% of the liquid clathrate (LC)) with the solution (S) at the conditions (e.g. temperatures) used during the step (I).

Further the solution (S) must be also inert in relation to the compounds of the solid catalyst system to be produced. The term "inert in relation to the compounds" means herein that the solution (S) of the continuous phase (CP) is chemically inert, i.e. undergoes no chemical reaction with any solid catalyst system forming compound or catalyst system precursor forming compound (e.g. the organometallic compound (O) and the aluminoxane (A)). Thus, the solid particles of the catalyst system or any precursor thereof are formed in the droplets from the compounds which originate from the dispersed phase, i.e. are provided to the emulsion in the liquid clathrate (LC) dispersed into the continuous phase forming solution (S).

To achieve the desired conditions for the emulsion preparation the solution (S) must be carefully chosen. Accordingly the first component of the solution (S) must be a non-halogenated fluid (NF), preferably a silicon fluid (SF). As already mentioned above, the non-halogenated fluid (NF), i.e. the silicon fluid (SF), differs from the organo-silicon compound (OS), which is preferably used as the compound (B) when generating the liquid clathrate (LC).

A silicon fluid (SF) according to this invention is understood as known in the art. Reference is made inter alia to Ullmann's Encyclopedia of Industrial Chemistry 1993, Vol. A24, pages 57 to 93. Accordingly a silicon fluid (SF) according to this invention has preferably (a) a weight average molecular weight (Mw) of 300 to 50,000 g/mol, more preferably of 1,000 to 30,000 g/mol, like 5,000 to 15,000 g/mol, and/or (b) a kinematic viscosity at 25° C. of at least 10 cSt, more preferably in the range of 10 to 1500 cSt.

Preferred silicon fluids (SF) are those selected from the group consisting of methylsilicon fluid, methylphenylsilicon fluid, methylhydrogensilicon fluid, and mixtures thereof. More preferably the silicon fluid (SF) comprises, yet more preferably consists of, a methylsilicon fluid.

In one specific preferred embodiment the silicon fluid (SF) is a methylsilicon fluid having (a) a weight average molecular weight (Mw) of 300 to 50,000 g/mol, more preferably of 1,000 to 30,000 g/mol, like 5,000 to 15,000 g/mol, and/or (b) a kinematic viscosity at 25° C. in the range of 10 to 1200 cSt, more preferably in the range of 50 to 800 cSt, like 100 to 300 cSt.

Such silicon fluids (SF) are commercially available, for instance from Dow Corning and sold under the trade name Dow Corning 200® Fluids. However, the invention is not restricted to these commercial products, but any silicon fluids (SF) fulfilling the requirements of the present invention can be used as well.

The second component of the solution (S) is the hydrocarbon solvent (HS). The hydrocarbon solvent (HS) is preferably fully miscible with the non-halogenated fluid (NF), preferably with the silicon fluid (SF). The presence of the hydrocarbon solvent (HS) in the solution (S) assures that the catalyst system (CS) components of the liquid clathrate (LC) do not immediately solidify when coming in contact with the solution (S). Accordingly the hydrocarbon solvent (HS) is preferably an aromatic hydrocarbon solvent, such as for example toluene, benzene, xylenes, ethylbenzene, cumene, mesitylene or cumene. More preferably the hydrocarbon compound (HS) is toluene.

The hydrocarbon solvent (HS) can be different to the hydrocarbon compound (HC) used for the preparation of the liquid clathrate (LC), however it is preferred that the hydrocarbon solvent (HS) and the hydrocarbon compound (HC) are identical. In one specific embodiment the hydrocarbon solvent (HS) and the hydrocarbon compound (HC) are aromatic, more preferably are toluene.

Especially good results are achievable in case the weight ratio of the non-halogenated fluid (NF), i.e. the silicon fluid (SF), and the hydrocarbon solvent (HS) is in a specific range. Thus it is appreciated that the weight ratio of the non-halogenated fluid (NF), i.e. the silicon fluid (SF), and the hydrocarbon solvent (HS) in the solution (S) is 4.0:1.0 to 1.0:1.5, more preferably is 3.0:1.0 to 1.0:1.0, yet more preferably is 3.0:2.0 to 1.5:1.0. This specific ratio of the non-halogenated fluid (NF), i.e. the silicon fluid (SF), and the hydrocarbon solvent (HS) ensures best that the emulsion (E) of the solution (S) and the liquid clathrate (LC) is formed and an immediate solidification of the catalyst system is not initiated. The optimal amount of hydrocarbon solvent (HS) needed in the non-halogenated fluid (NF), i.e. the silicon fluid (SF), will depend on "clathration degree", e.g. how much compound (B) is used preparing the liquid clathrate (LC).

Due to the above solvent properties of the solution (S) toward the liquid clathrate (LC), the "droplet form" of the catalyst system compounds remains even if solution (S) used initially is removed during solidification e.g. by heating the system.

If desired for the formation of the emulsion (E) a surfactant can be additionally added, however the advantage of the present process is that such surfactants, like perfluorinated hydrocarbons are not needed and thus not employed. Thus in a specific embodiment of the instant process no perfluorinated hydrocarbons as surfactant, even more preferred no surfactants at all are used.

Suitable processes for dispersing the liquid clathrate (LC) within the solution (S) to form an emulsion (E) is the use of a mechanical device as well as the use of ultrasound for mixing, as known to the skilled person. The process parameters, such as time of mixing, intensity of mixing, type of mixing, power employed for mixing, such as mixer velocity or wavelength of ultrasound employed, viscosity of solvent phase, are used for adjusting the size of the catalyst system.

Regardless of the method used to form the emulsion (E), its temperature prior to step (II) is preferably −20 to +50° C., more preferably −10 to +40° C., yet more preferably −5 to 30°C., and still more preferably 0 to 20° C. Suitable temperature is dependent on the solvents used and the "clathrating degree". By "low clathrating degree" the emulsion temperature can be lower, and with very high "clathrating degree" a higher temperature is more preferable.

In step (II) of the process of the invention the catalyst system (SC) is solidified from the droplets of the dispersed phase. Solidification can be carried out batch wise or, if possible preferable continuously. During the solidification the solubility of the hydrocarbon compound (HC) of the dispersed phase, i.e. the liquid clathrate (LC), used in emulsion formation in the continuous phase is increased. This change can be done e.g. by changing the temperature of the emulsion (E), by diluting the emulsion (E) or by adding any other solubility changing agent into the emulsion (E) or by any combinations of these methods. Other alternatives to affect solidification are prepolymerisation reaction within said dispersed phase, cross-linking (e.g. partially or fully) the catalyst within said dispersed phase by adding a cross-linking agent; and inducing a chemical reaction within the dispersed phase which causes solid catalyst particles to solidify.

In a preferred method the emulsion (E) is transferred into a liquid (Ld) in which at least the hydrocarbon compound (HC) of the liquid clathrate (LC), preferably the hydrocarbon compound (HC), the non-halogenated fluid (NF), i.e. the silicon fluid (SF), and/or the hydrocarbon solvent (HS) is/are soluble. Preferably the liquid (Ld) differs from the hydrocarbon compound (HC), the hydrocarbon solvent (HS) and the organo-silicon compound (OS).

Preferably the liquid (Ld) is a silicon fluid as known in the art. Reference is made inter alia to Ullmann's Encyclopedia of Industrial Chemistry 1993, Vol. A24, pages 57 to 93. Accordingly the liquid (Ld) is a silicon fluid preferably having (a) a weight average molecular weight (Mw) 300 to 50,000 g/mol, more preferably of 1,000 to 30,000 g/mol, like 5,000 to 15,000 g/mol and/or (b) a kinematic viscosity at 25° C. in the range of 10 to 1,200 cSt, more preferably in the range of 50 to 800 cSt, like 100 to 300 cSt.

Preferred the liquid (Ld) is selected from the group consisting of methylsilicon fluid, methylphenylsilicon fluid, methylhydrogensilicon fluid, and mixtures thereof. More preferably the liquid (Ld) comprises, yet more preferably consists of, a methylsilicon fluid.

It is especially preferred that the liquid (Ld) and the non-halogenated fluid (NF), i.e. the silicon fluid (SF), are identical. Thus in one embodiment the liquid (Ld) and the non-halogenated fluid (NF), i.e. the silicon fluid (SF), are the same and selected from the group consisting of methylsilicon fluid, methylphenylsilicon fluid, methylhydrogensilicon fluid, and mixtures thereof. Concerning the preferred viscosity and molecular weight ranges reference is made above. Thus all definitions and preferred embodiments defined for silicon fluid (SF) can be applied to the definitions for liquid (Ld) as well.

The amount of the liquid (Ld) used to initiate solidification in step (II) depend very much on the solution (S) and its components. However the amount must be at least as such that dilution of the hydrocarbon compound (HC) and the hydrocarbon solvent (HS) is achieved. Typically the amount of solution (S) (in vol) is at least two times, preferably at least 5 times, like 6 to 12 times the amount of the hydrocarbon solvent (HS) part of the solution (S).

The transfer of the emulsion (E) into the liquid (Ld) can be accomplished known in the art. Typically after transfer the obtained mixture is agitated (stirred) to facilitate the formation of the solid catalyst system (CS) particles. No specific temperature is needed. Solidification can be accomplished in a broad temperature range, like 2 to 80° C. depending on the viscosity of the fluids Very good results are achievable at temperatures between 15 to 30° C., like 20 to 24° C., if a fluid having a viscosity in in the range about 100-200 cSt is used.

Due to the dilution solidification of the droplet-like dispersed phase (DP) is effected and yields to the formation of the solid catalyst system (CS), which in turn leads to a suspension.

The solid catalyst system (CS) particles which are obtained by the solidification step (B) may be separated and recovered by any procedure known in the art from the suspension. For example, the suspension may be filtered. Other commonly known methods for isolating are decanting, centrifuging and flotation. The catalyst system (CS) may then be optionally washed and/or dried to remove any solvent residuals present in the particles. The washing and/or drying of the catalyst particles may be carried out in any manner conventional in the art.

The instant process leads to a solid catalyst system (CS), in particular to a solid catalyst system (CS) not comprising any external solid support material. Such solid catalyst system (CS) are featured by a low surface area and/or porosity. These features can be seen from the figures of the catalyst particles.

Further the solid catalyst system (CS) typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

A specific feature of the solid catalyst system (CS) is that it has an exceptional narrow particle size distribution not achieved before.

Further the present invention is also directed to a liquid clathrate (LC) comprising
(a) a lattice (L) being the reaction product of
  (i) aluminoxane (A), like methylalumoxane (MAO),
  (ii) an organometallic compound (C) of a transition metal (M) is a compound of formula (IV)

$(Cp)_2RMX_2$          (IV)

wherein
  "M" is zirconium (Zr), titanium (Ti), or hafnium (Hf), preferably zirconium (Zr) or hafnium (Hf), like zirconium (Zr),
  each "X" is independently a α-ligand,
  each "Cp" is independently an indenyl ligand which coordinates to the transition metal (M), said indenyl ligand is substituted at least at the five membered ring and at the six membered ring of the indenyl ligand,
  "R" is a bridging group linking said indenyl ligands,
  (iii) an organo-silicon compound (OS) being effective to form the lattice (L) with the aluminoxane (A) and the organometallic compound (C),
and
(b) a guest (G) being an hydrocarbon compound (HC).

Concerning the preferred embodiments of the organometallic compound (C) of a transition metal (M) of formula (IV), the aluminoxane (A), the organo-silicon compound (OS), and hydrocarbon compound (HC) it is referred to the information provided above.

Further the present invention is directed to the use of the solid catalyst system (CS) as defined herein for the preparation of a polymer, like polypropylene or polyethylene and their copolymer(s).

The present invention is further described by way of examples.

EXAMPLES

1. Definitions/Measuring Methods

The following definitions of terms and determination methods apply for the above general description of the invention as well as to the below examples unless otherwise defined.

Mw, Mn, MWD

Mw/Mn/MWD are measured by Gel Permeation Chromatography (GPC) according to the following method:

The weight average molecular weight (Mw), the number average molecular weight (Mn), and the molecular weight distribution (MWD=Mw/Mn) is measured by a method based on ISO 16014-1:2003 and ISO 16014-4:2003. A Waters Alliance GPCV 2000 instrument, equipped with refractive index detector and online viscosimeter is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

Mean particle size is measured with Coulter Counter LS200 at room temperature with n-heptane as medium; particle sizes below 100 nm by transmission electron microscopy.

ICP Analysis

The elemental analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilize for two hours.

The analysis was run at room temperature using a Thermo Elemental IRIS Advantage XUV Inductively Coupled Plasma—Atomic Excitation Spectrometer (ICP-AES) which was calibrated immediately before analysis using a blank (a solution of 5% $HNO_3$, 3% HF in DI water), a low standard (10 ppm Al in a solution of 5% $HNO_3$, 3% HF in DI water), a high standard (50 ppm Al, 50 ppm Hf, 20 ppm Zr in a solution of 5% $HNO_3$, 3% HF in DI water) and a quality control sample (20 ppm Al, 20 ppm Hf, 10 ppm Zr in a solution of 5% $HNO_3$, 3% HF in DI water).

The content of transition metal was monitored using the 282.022 nm and 339.980 nm lines and the content for zirconium using 339.198 nm line. The content of aluminium was monitored via the 167.081 nm line, when Al concentration in ICP sample was between 0-10 ppm and via the 396.152 nm line for Al concentrations between 10-100 ppm.

The reported values, required to be between 0 and 100, or further dilution is required, are an average of three successive aliquots taken from the same sample and are related back to the original catalyst using equation 1.

$$C = \frac{R \times V}{M} \qquad \text{Equation 1}$$

wherein

C is the concentration in ppm, related to % content by a factor of 10,000

R is the reported value from the ICP-AES

V is the total volume of dilution in ml

M is the original mass of sample in g

If dilution was required then this also needs to be taken into account by multiplication of C by the dilution factor Viscosity Kinematic viscosity/cSt: ASTM D445-09

Chemicals

MAO:

was purchased from Albemarle and used as a 30 wt-% solution in toluene.

Metallocene 1 n-butyl-cyclopentadienyl zirconium dichloride

Producer: Crompton, product code EURECEN 5031,

Metallocene 2
rac-ethylene-bis[(2-tert-butyldimethylsiloxy)indenyl]zirconium dichloride, Preparation according to US 6,277,778 B1

Metallocene 3
rac-dimethylsilanediyl-bis[(2-methyl-4-phenyl)-indenyl]$_2$ zirconium dichloride, Producer NORQUAYTECH, CAS No: 153882-67-8

Metallocene 4
tris-(tert-butyl) phosphinimide-n-butyl-cyclopentadienyl titanium dichloride, Preparation according to: Stephan, D. W.; Stewart, J. C.; Guérin, F.; Courtenay, S.; Kickham, J.; Hollink, E.; Beddie, C.; Hoskin, A.; Graham, T.; Wei, P.; Spence, R. E. V. H.; Xu, W.; Koch, L. Gao, X.; Harrison, D. G. *Organometallics,* 2003, 22, 1937

Metallocene 5
rac-cyclohexyl(methyl)silanediyl-bis(2-methyl-4-(4'-tert-butyl-phenyl)inden-1-yl) zirconium dichloride, CAS no 888227-55-2, preparation is described e.g. in WO 2006/060544

Metallocene 6
(rac-μ-{bis-[η$^5$-2-methyl-4-(4-tert-butylphenyl)-1,5,6,7-tetrahydro-s-indacen-1-yl]dimethylsilanediyl}zirconium dichloride Preparation according to WO2006/097497A1

Comparative Catalyst:

Catalyst prepared according the principles teached in patent EP 0 678 103. The used metallocene is n-butyl-cyclopentadienyl zirconium dichloride (Metallocene 1), Zr-content is 0.13±0.03 w %, Al content 7.8±1.8 w % used silica support is Grace SYLOPOL 2056PI calsinated at 600° C. for 4 hours.

Silicon Oil:
DOW CORNING® 200 Fluid, viscosity 100 cSt according to the datasheet of the provider OMTS:
Octamethyltrisiloxane Mw 236.53 g/mol, CAS 107-51-7, ALDRICH product No: 235709

K—CH$_2$Ph
Preparation method: Measure 22.4 g (200 mmol) potassium tert-butoxide into a 500 ml three-neck flask inside the dry box. Close the flask with one stopcock, one vacuum valve and one septa. Use big stirring magnet. Then add 200 ml of dry toluene under stirring. All the material does not dissolve. Measure 86.4 ml n-butyllithium (200 mmol) solution into a dry 100 ml graduated cylinder with a septum inertly. Add the n-butyllithium slowly onto the toluene-t-BuOK solution dropwise under some 40 min at room temperature. A thick precipitate forms almost immediately and the colour changes via orange to brick red. Stir for 2-3 h at room temperature. A dark red precipitate is obtained in the end. Filter the precipitate off using a large P3 sintered funnel and a siphon and wash the cake with 5×100 ml of toluene and then with 50 ml of pentane. Discard the toluene washings by changing a new flask inertly under the filter funnel and dry the solid product on the filter in a vacuum.

Toluene

All the chemicals and chemical reactions were handled under an inert gas atmosphere using Schlenk and glovebox techniques, with oven-dried glassware, syringes or needles.

General Catalyst Preparation Procedure for Catalyst Examples 1 to 12

Preparation of Metallocene/MAO Complex Solution

Metallocene compounds, amount and type listed in table 1, and 15 ml MAO containing 13.28 w.-% aluminium, were mixed 60 min Preparation of Clathrate Into previously prepared complex solution, clatherating agent (compound (B), amount and typelisted in table 1 was added and the reaction mixture was stirred over weekend at room temperature (20 to 25° C.). After 96 h, stirring was stopped and separation of metallocene/MAO into two phases was clearly seen. The upper phase (toluene) was removed and the lower liquid clathrate phase was washed once with 5 ml toluene.

Preparation of the Emulsion

Into the emulsion reactor 25 ml of the toluene and 25 ml DOW CORNING® 200 Fluid (silicon oil) (viscosity 100 cSt) was added. Solution was kept at room temperature 20 to 25° C. Emulsion was made by adding 7 ml of liquid clathrate solution prepared as above. It took some minutes to stir all added liquid clathrate evenly into silicon oil/toluene solution. Emulsion was stirred for 15 min (712 rpm) at room temperature.

Solidification of Catalyst System

The glass reactor (volume 250 ml) was connected to the argon line at 25° C. 150 ml of the circulated, filtered and argon bubbled DOW CORNING® 200 Fluid (viscosity 100 cSt) was added by using a syringe. Then the solvent was let to be at 25° C. under stirring (500 rpm). The emulsion (from emulsion reactor) was transferred into this reactor by using a Teflon tube within couple of minutes (3 to 5 min) Temperature was kept at 20 to 25° C. stirring 200 rpm. After 60 min stirring was stopped and catalyst system was let to settle. Silicon oil was siphoned away.

Settling

Settling of catalyst system was easy and reasonable fast. Settled catalyst system slurry containing some silicon oil, was transferred into glove box.

Washing

Figure 1:
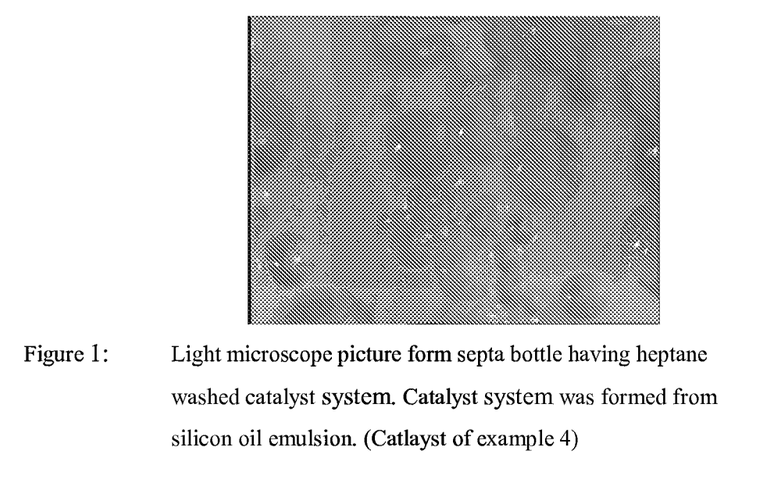
FIG. 1 illustrates a light microscope picture form septa bottle having heptane washed catalyst system. Catalyst system was formed from silicon oil emulsion. (Catalyst of example 4)
Figure 2:
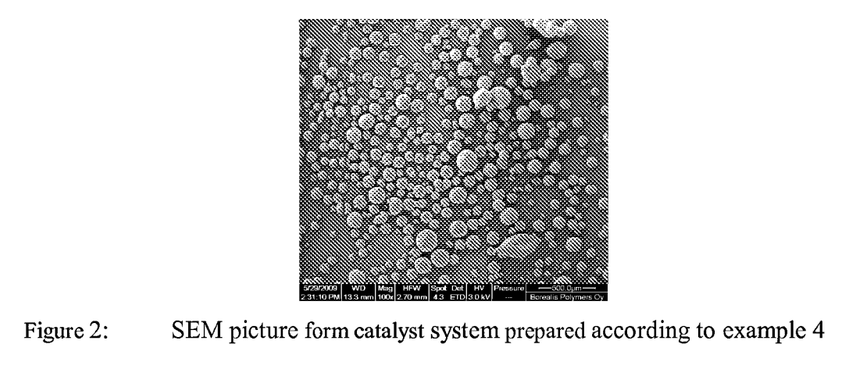
FIG. 2 illustrates SEM picture form catalyst system prepared according to example 4.
Figure 3:
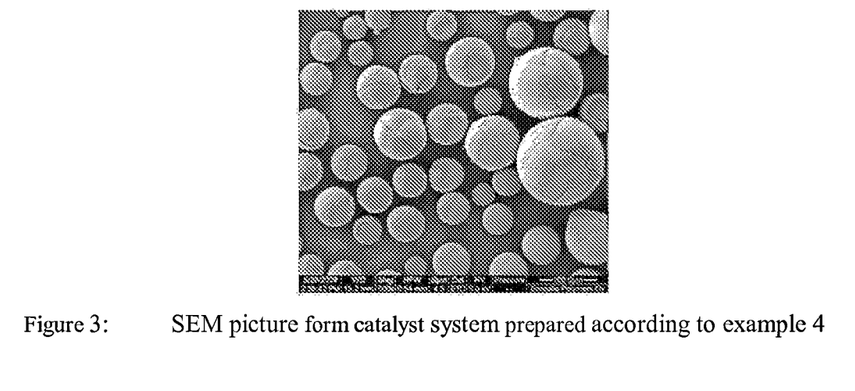
FIG. 3 illustrates SEM picture form catalyst system prepared according to example 4.
Figure 4:
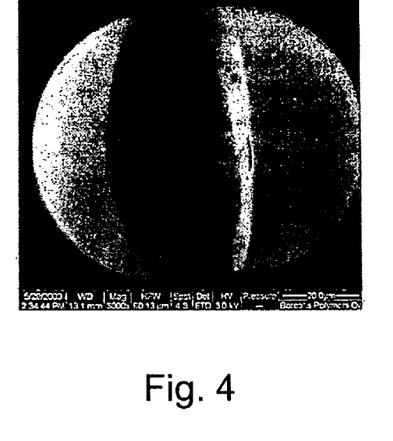
FIG. 4 illustrates SEM picture form catalyst system prepared according to example 4.
Figure 5:
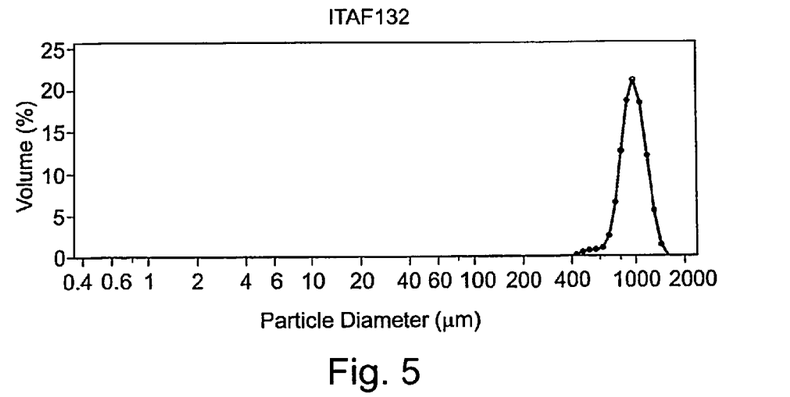
FIG. 5 illustrates polymer particle size distribution by Coulter LS Particle Sized Analyzer of example 14.
Figure 6:
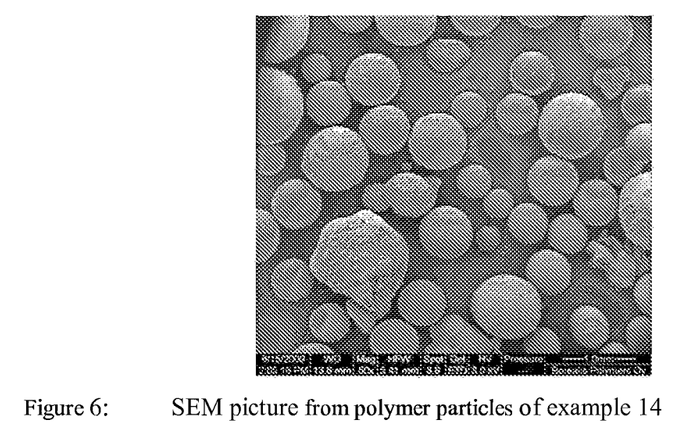
FIG. 6 illustrates SEM picture from polymer particles of example 14.
Figure 7:
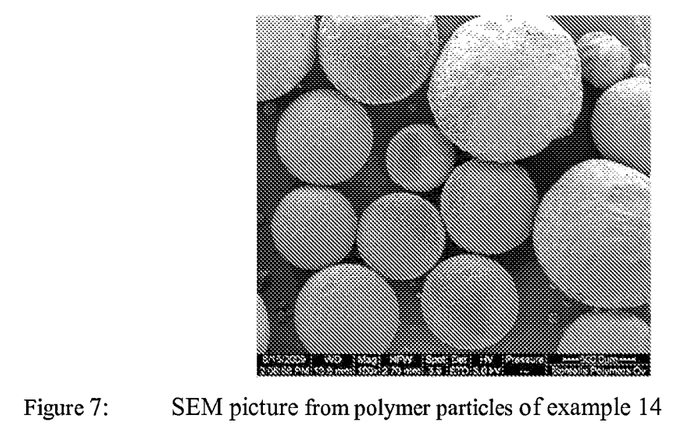
FIG. 7 illustrates SEM picture from polymer particles of example 14.
Figure 8:
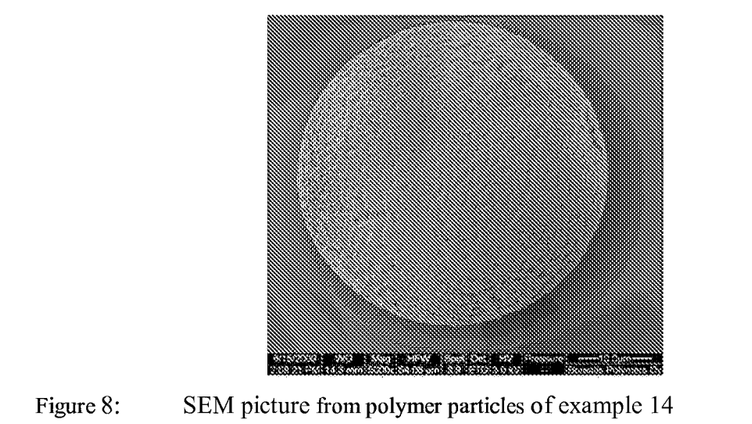
FIG. 8 illustrates SEM picture from polymer particles of example 14.
Figure 9:
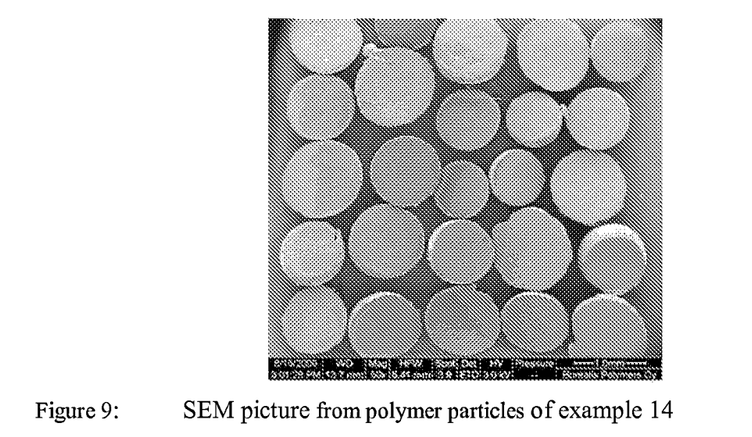
FIG. 9 illustrates SEM picture from polymer particles of example 14.

Catalyst slurry was washed next day with heptane. The morphology of the catalyst system particles was excellent (FIGS. 1 to 4)

Comparative Catalyst Example:

Catalyst prepared according the principles teached in patent EP 0 678 103. The used metallocene is n-butyl-cyclopentadienyl zirconium dichloride, Zr-content is 0.13±0.03 w %, Al content 7.8±1.8 w % used silica support is Grace SYLOPOL 2056P1 calsinated at 600° C. for 4 hours.

TABLE 1

| Catalyst preparation examples | | | | | | | | |
|---|---|---|---|---|---|---|---|---|
| Example | | Ex 1 | Ex 2 | Ex 3 | Ex 4 | Ex 5 | Ex 6 | Ex 7 |
| MC-1 | [mg] | 206.1 | 210.3 | 219.5 | — | — | — | — |
| MC-2 | [mg] | — | — | — | 216.3 | 216.3 | — | — |
| MC-3 | [mg] | — | — | — | — | — | 230.5 | 232.5 |
| OMTS | [mg] | 0.25 | 0.5 | 1.0 | 0.5 | 1.0 | 0.25 | 1.0 |

OMTS octamethyltrisiloxane

TABLE 2

| Catalyst preparation examples | | | | | | | |
|---|---|---|---|---|---|---|---|
| Example | | Ex 8 | Ex 9 | Ex 10 | Ex 11 | Ex 12 | CE1 |
| MC-4 | [mg] | 211.8 | — | — | — | — | — |
| MC-5 | [mg] | — | 218.7 | 216.5 | — | · | — |
| MC-6 | [mg] | — | — | — | 206.8 | — | — |
| MC-1 | [mg] | — | — | — | · | · | MC-1 |
| MC-3 | [mg] | — | — | — | — | · 197.2 | — |
| OMTS | [mg] | 1.0 | 0.5 | 1.0 | 1.0 | — | 0 |
| K—CH$_2$—Ph | [mg /15 ml MAO] | — | — | — | — | 242.4 | 0 |

OMTS octamethyltrisiloxane

Parallel Polymerization Reactor (PPR) Polymerization Procedure: Ethylene Polymerizations Polymerization experiments were carried out in PPR (Parallel Pressure Reactor) which arestirred reactors each reactor having a volume of 21 mL. Reactor was conditioned by purgingit with dry nitrogen for 6 hours at 80° C. Pre-weighed disposable glass vials and disposableflat stirring paddles were fitted into the reactor. Reactor was then closed and thoroughlyflushed with ethylene prior the experiment. 5 µmol of freshly made TIBA solution (100 µL of 50 mM solution in heptane) and 100 uL of 1-hexene were added through a valve to all 48 reactors. Reactors were pressurised to 278 kPa (40 psi) with ethylene to ensure that all the individual reactor was maintaining pressure. Stirring speed was the set up to 800 rpm for all reactors and the temperature increased to 80° C. Once the temperature was stable the reactors were pressurised to 1034 kPa (150 psi). The reactor temperatures were maintained at 80° C. by computer control during the experiment. Catalyst slurries were made by mixing catalysts with dodecane so that concentration of the resulting slurry was 6 mg/mL. Vortexing of 1200 rpm was applied to ensure formation of homogenous slurry. Polymerization was initiated by adding the catalysts into the reactors through a valve. Pressure in the reactors was maintained at 1034 kPa (150 psi) during the experiment. Polymerizations were continued for 30 minutes after which the reaction was terminated by addition of CO2 (20%/80% of CO2/N2 was used to pressurize the reactors to 2.9 MPa). Once cooled, the reactor was degassed and flushed repeatedly with nitrogen.

Polymerisation results are given in Table 3.

Propylene Polymerizations

Polymerization experiments were carried out in PPR (Parallel Pressure Reactor) which arestirred reactors each reactor having a volume of 21 mL. Reactor was conditioned by purgingit with dry nitrogen for 6 hours at 80° C. Pre-weighed disposable glass vials and disposableflat stirring paddles were fitted into the reactor. Reactor was then closed and thoroughlyflushed with propylene prior the experiment. 5 µmol of freshly made TIBA solution (200 µL of 25 mM solution in heptane) was added through a valve to all 48 reactors. Reactors were pressurised to 278 kPa (40 psi) with propylene to ensure that all the individual reactors were maintaining pressure. After ensuring that the reactors had sealed, hydrogen was added batch wise to all the reactors (207 kPa, 30 psi, of 2%/98% of H2/N2 mixture). Stirring speed was the set up to 800 rpm for all reactors and the temperature increased to 70° C. Once the temperature was stable the reactors were pressurised to 793 kPa (115 psi). The reactor temperatures were maintained at 70° C. by computer control during the experiment. Catalyst slurries were made by mixing catalysts with dodecane so that concentration of the resulting slurry was 12 mg/mL. Vortexing of 1200 rpm was applied to ensure formation of homogenous slurry. Once the reactor temperature was stabilized catalysts were added into the reactors though a valve. Pressure in the reactors was maintained at 793 kPa (115 psi) during the experiment. Polymerizations were continued for one hour after which the reaction was terminated by addition of CO2 (20%/80% of CO2/N2 was used to pressurize the reactors to 2.9 MPa). Once cooled, the reactor was degassed and flushed repeatedly with nitrogen.

Polymerisation results are given in Table 4.

TABLE 3A

PPR polyethylene polymerisation with catalyst according examples Ex 1 to 5

| Polymerisation Catalyst of ex. | | P1 Ex1 | P2 Ex2 | P3 Ex3 | P4 Ex4 | P5 Ex5 |
|---|---|---|---|---|---|---|
| Catalyst amount | [mg] | 1.2 | 1.2 | 1.2 | 0.6 | 0.9 |
| Pol. yield | [mg] | 84.3 | 84.1 | 72.3 | 200.8 | 229.3 |
| Activity | [gPE/g cat] | 70 | 70 | 60 | 335 | 255 |

PPR polyethylene polymerisation with catalyst according examples Ex 6 to 8 and Compa P9

| Polymerisation Catalyst of ex. | | P6 Ex6 | P7 Ex7 | P8 Ex8 | P9 (Comp.) CE1 |
|---|---|---|---|---|---|
| Catalyst amount | [mg] | 1.2 | 2.5 | 2.5 | 1 |
| Pol. yield | [mg] | 59.1 | 139.8 | 224.4 | 197.1 |
| Activity | [gPE/g cat] | 49 | 56 | 90 | 197 |

TABLE 4

PPR Polypropylene polymerisation examples and results with catalyst according catalyst preparation Ex 6 and Ex 9 to 11

| Polymerisation | | P10 | P11 | P12 | P13 |
|---|---|---|---|---|---|
| Catalyst of ex. | | Ex 9 | Ex 10 | Ex 11 | Ex 6 |
| Catalyst | [mg] | 2 | 2 | 2 | 2 |
| Pol. yield | [mg] | 154.6 | 89.6 | 94.6 | 94.6 |
| Activity | [gPE/g cat] | 77.3 | 45 | 47 | 47 |

Polymerisation Example 14

Bench Scale PE-Polymerisation

At 20° C. propane 800 ml. At 80° C. and at 32 bar pressure 307.5 mg catalyst silicon oil slurry (catalyst example 4) was introduced into reactor by flushing it with 200 ml propane. After that 37 ml 1-hexene and 10 bar ethylene were introduced into reactor. Final polymerisation conditions are: Temperature 80° C., total pressure 42 bar, ethylene partial pressure 10 bar, no hydrogen was used. After 60 min polymerisation polymer yield was 196 g. Ash content of polymer was 0.08 w % indicating catalyst productivity of 1.25 kgPE/g cat h. Ash content is good measure of catalyst activity/productivity in cases where catalyst oil slurry is used (accurate catalyst amount is not known). Polymer Mw=140000, Mn=36700, and 1-hexene content in polymer 6.0 wt.-%.

Polymerisation Example 15

Bench Scale PE-Polymerisation

At 20° C. propane 800 ml. At 80° C. and at 32 bar pressure 113 mg (catalyst example 5) was introduced into reactor by flushing it with 200 ml propane. After that 37 ml 1-hexene and 10 bar ethylene were introduced into reactor. Final polymerisation conditions are: Temperature 80° C., total pressure 42 bar, ethylene partial pressure 10 bar, no hydrogen was used. After 60 min polymerisation polymer yield was 175 g. Catalyst productivity was 1.6 kgPE/g cat h Ash content of polymer was 0.05 wt.-%. Polymer Mw=141000, Mn=41400, and 1-hexene content in polymer 5.9 wt.-%, bulk density of polymer 490 kg/m$^3$ and MFR$_2$=0.12 g/10 min and MFR$_{21}$=9.15 g/10 min.

Polymerisation Example 16

Bench Scale PP-Polymerisation Procedure

A 5 liter stainless steel reactor was used for propylene polymerizations. 1100 g of liquid propylene (Borealis polymerization grade) was fed to the reactor. 0.2 ml triethylaluminum (100%, purchased from Crompton) was fed as a scavenger and 15 mmol hydrogen as chain transfer agent. The reactor temperature was set to 30° C. The 96.1 mg of catalyst prepared according example 9 was flushed into to the reactor with nitrogen overpressure. The reactor was heated up to 70° C. in a period of 15 minutes. After polymerisation for 30 minutes the remaining propylene was flushed out and the polymer was dried and weighted. The yield of polymer was 10 g. Catalysts productivity is 210 gPP/[g cat×h].

Polymerisation Example 17

Bench Scale PP-Polymerisation Procedure

A 5 liter stainless steel reactor was used for propylene polymerizations. 1100 g of liquid propylene (Borealis polymerization grade) was fed to the reactor. 0.2 ml triethylaluminum (100%, purchased from Crompton) was fed as a scavenger and 15 mmol hydrogen as chain transfer agent. The reactor temperature was set to 30° C. The 57.3 mg of catalyst prepared according example 10 was flushed into to the reactor with nitrogen overpressure. The reactor was heated up to 70° C. in a period of 15 minutes. After polymerisation for 30 minutes the remaining propylene was flushed out and the polymer was dried and weighted. The yield of polymer was 8 g. Catalysts productivity is 280 gPP/[g cat×h].

Polymerisation Example 18

Bench Scale PP-Polymerisation Procedure

A 5 liter stainless steel reactor was used for propylene polymerizations. 1100 g of liquid propylene (Borealis polymerization grade) was fed to the reactor. 0.2 ml triethylaluminum (100%, purchased from Crompton) was fed as a scavenger and 15 mmol hydrogen as chain transfer agent. The reactor temperature was set to 30° C. The 27.2 mg of catalyst prepared according example 12 was flushed into to the reactor with nitrogen overpressure. The reactor was heated up to 70° C. in a period of 15 minutes. After polymerisation for 30 minutes the remaining propylene was flushed out and the polymer was dried and weighted. The yield of polymer was 8 g. Catalysts productivity is 590 gPP/[g cat×h].

The invention claimed is:
1. A process for the preparation of a solid catalyst system (CS) comprising the steps of:
   (I) generating an emulsion (E) by dispersing a liquid clathrate (LC) in a solution (S) wherein:
      (i) the solution (S) constitutes the continuous phase (CP) of the emulsion (E), and
      (ii) the liquid clathrate (LC) constitutes in form of droplets the dispersed phase (DP) of the emulsion (E);

(II) solidifying said dispersed phase (DP) to convert said droplets to solid particles; and
(III) optionally recovering said particles to obtain said catalyst system (CS), wherein:
(a) the liquid clathrate (LC) comprises:
  (i) a lattice (L) being the reaction product of:
    (α) aluminoxane (A),
    (β) an organometallic compound (O) of a transition metal (M) of Group 3 to 10 of the Periodic Table (IUPAC 2007) or of an actinide or lanthanide, and
    (γ) a compound (B) being effective to form with the aluminoxane (A) and the organometallic compound (O) the lattice (L), and
  (ii) a guest (G) being an hydrocarbon compound (HO), and
(b) the solution (S) comprises non-halogenated fluid (NF) and a hydrocarbon solvent (HS), said non-halogenated fluid (NF) being a silicon fluid (SF),
wherein said compound (B) is an M-X compound which is an organic, inorganic or organometallic compound which can potentially dissociate or partially dissociate into cationic ($M^+$) and anionic ($X^-$) components or said compound (B) is an organo-silicon compound (OS) being different to the silicon fluid (SF), said organo-silicon compound (OS) being a hydrocarbylsiloxane of the formula $R_3Si-O[-SiR_2-O]_n-SiR_3$ or $Si-[O-R]_4$, and wherein R is, independently, a hydrocarbyl group having up to about 18 carbon atoms and n is 0 to 3, or said organo-silicon compound (OS) being a hydrocarbylpolysiloxane having from 2 to 6 silicon atoms in the molecule and which are separated from each other by an oxygen atom such that there is a linear, branched or cyclic backbone of alternating Si and oxygen atoms, with the remainder of the four valence bonds of each of the silicon atoms individually satisfied by an univalent hydrocarbyl group R being, independently, a hydrocarbyl group having up to about 18 carbon atoms.

2. A process according to claim 1, wherein the solidification of step (II) is accomplished by transferring the emulsion (E) into a liquid (Ld) in which the non-halogenated fluid (NF), the hydrocarbon solvent (HS), and the hydrocarbon compound (HC) are soluble.

3. A process according to claim 1, wherein the liquid clathrate (LC) is obtained by:
(i) preparing a solution (SO1) of the hydrocarbon compound (HC), the aluminoxane (A) and the organometallic compound (O),
(ii) adding to said solution (SO1) the compound (B),
(iii) obtaining a two phase system (TPS1), the upper phase being a hydrocarbon compound (HC) rich phase and the lower phase being the liquid clathrate (LC) phase, and
(iv) separating the lower phase being the liquid clathrate (LC) phase from upper phase being the hydrocarbon compound (HC) rich phase.

4. A process according to claim 1, wherein the liquid clathrate (LC) is obtained by:
(i) preparing a mixture (M2) of the hydrocarbon compound (HC), the aluminoxane (A) and the compound (B),
(ii) adding to said mixture (M2) the organometallic compound (O),
(iii) obtaining a two phase system (TPS2), the upper phase being a hydrocarbon compound (HC) rich phase and the lower phase being the liquid clathrate (LC) phase, and
(iv) separating the lower phase being the liquid clathrate (LC) phase from upper phase being a hydrocarbon compound (HC) rich phase.

5. A process according to claim 1, wherein:
(a) the hydrocarbon compound (HC) and the hydrocarbon solvent (HS) are identical,
(b) the liquid (Ld) and the silicon fluid (SF) are identical, or
(c) the hydrocarbon compound (HC) and the hydrocarbon solvent (HS) are identical and the liquid (Ld) and the silicon fluid (SF) are identical.

6. A process according to claim 1, wherein the hydrocarbon compound (HC) and the hydrocarbon solvent (HS) are independently from each other an aromatic hydrocarbon.

7. A process according to claim 1, wherein the liquid (Ld) and the silicon fluid (SF) are independently from each other selected from the group consisting of methylsilicon fluid, methylphenylsilicon fluid, methylhydrogensilicon fluid, and mixtures thereof.

8. A process according to claim 1, wherein the M-X compound is an organic, inorganic or organometallic compound which can potentially dissociate or partially dissociate into cationic and anionic components and "M" is an alkali earth metal or alkaline earth metal, and "X" is selected from the group consisting of halide, pseudohalide, allylic hydrocarbon group, and benzylic hydrocarbon group.

9. A process according to claim 1, wherein the M-X compound is selected from the group consisting of KCl, KF, NaF, KH, LiH, $KOSiMe_3$, $NaBPh_4$, $Me_4NCl$, $(Octyl)_3NClMe$, $MePh_3PBr$, $KB(C_6F_5)_4$, and $KCH_2-C_6H_5$.

10. A process according to claim 1, wherein the weight ratio of the non-halogenated fluid (NF) and the hydrocarbon solvent (HS), in the solution (S) is 4.0:1.0 to 1.0:1.5.

11. A process according to claim 1, wherein the organometallic compound (O) of the transition metal (M) is a compound of formula (I):

$$(L)_m R_n MX_q \qquad (I),$$

wherein "M" is a transition metal as defined in claim 1,
each "X" is independently a σ-ligand,
each "L" is independently an organic ligand, which coordinates to the transition metal (M),
"R" is a bridging group linking said organic ligands (L),
"m" is 2 or 3,
"n" is 0, 1 or 2,
"q" is 1, 2 or 3, and
"m"+"q" is equal to the valency of the transition metal (M).

* * * * *